US006600989B2

(12) United States Patent
Sellnau et al.

(10) Patent No.: US 6,600,989 B2
(45) Date of Patent: Jul. 29, 2003

(54) APPARATUS AND METHOD FOR EARLY INTAKE VALVE CLOSING

(75) Inventors: Mark C. Sellnau, Bloomfield Hills, MI (US); James F. Sinnamon, Birmingham, MI (US)

(73) Assignee: Delphi Technologies, Inc., Troy, MI (US)

(*) Notice: Subject to any disclaimer, the term of this patent is extended or adjusted under 35 U.S.C. 154(b) by 192 days.

(21) Appl. No.: 09/864,657

(22) Filed: May 24, 2001

(65) Prior Publication Data

US 2002/0177938 A1 Nov. 28, 2002

(51) Int. Cl.[7] .............................. G06F 19/00; F01L 1/00
(52) U.S. Cl. ..................... 701/110; 123/90.15; 701/115
(58) Field of Search ............................... 701/110, 102, 701/115; 123/90.15, 90.11, 90.17

(56) References Cited

U.S. PATENT DOCUMENTS

| | | | | |
|---|---|---|---|---|
| 5,042,437 A | * | 8/1991 | Sakuragi et al. | 123/90.16 |
| 5,080,055 A | * | 1/1992 | Komatsu et al. | 123/90.11 |
| 5,823,151 A | * | 10/1998 | Elendt et al. | 123/90.16 |
| 6,220,233 B1 | * | 4/2001 | Pierpont | 123/568.12 |
| 2002/0129780 A1 | * | 9/2002 | Nohara et al. | 123/90.16 |

OTHER PUBLICATIONS

Article, H. Richter, D. Schwarzenthal, L. Spiegel, Dr. Ing. h.c. F. Porshe AG, Germany, "Variable Valve Actuation—Key Technology for High Specific Power Output and Low Exhaust Emissions", International Conference, Spark Ignition Engine: The CO2 Challenge, Nov. 27–28–29, 2002, Palazzo Ca'Vendramin Calergi, Venezia, Italy, (10 pages).

Variocam Plus—Eine Neue Ventilsteuerung Von Porche—Allzeit flexibel, Jun. 2000, MOE, p. 64, Germany.

Variocam Plus—Eine Neue Ventilsteuerung Von Porche, "Allzeit Flexibel", *aktuell technik*, "mot" magazine, Issue Jun. 2000, p. 64, (Germany).

* cited by examiner

*Primary Examiner*—Hieu T. Vo
(74) *Attorney, Agent, or Firm*—Patrick M. Griffin

(57) ABSTRACT

A method for early intake valve closing in an internal combustion engine having a crankshaft and at least one exhaust valve, the crankshaft having a top dead center position and a bottom dead center position, includes the step of determining engine operating load conditions and parameters. One of a plurality of predetermined valve lift profiles, each of which correspond to a respective range of engine operating load conditions and parameters, is selected dependent at least in part upon the engine operating load conditions and parameters. The engine is commanded to operate the engine intake valves according to the selected one of the plurality of predetermined valve lift profiles to thereby optimize fuel economy and reduce emissions at light to moderate engine loads, to improve torque and power at relatively full engine loads, and improve cold start engine operation under cold start engine conditions.

18 Claims, 4 Drawing Sheets

APPARATUS AND METHOD FOR EARLY INTAKE VALVE CLOSING

TECHNICAL FIELD

The present invention relates generally to an apparatus and method for controlling the operation of the valves of an internal combustion engine. More particularly, the present invention relates to an apparatus and method to achieve early intake valve closing to improve fuel economy and reduce undesirable emissions.

BACKGROUND OF THE INVENTION

Historically, the performance of an internal combustion engine has been limited by fixed valve lift profiles, i.e., fixed timing of the opening and closing of the valves relative to the angular position of the engine crankshaft and fixed lift of the valves. However, modern internal combustion engines may utilize one of several methods and/or devices to vary the valve lift profile to, at least in part, control the flow of gas and/or air into and/or out of the engine cylinders. Modern internal combustion engines may utilize devices, such as, for example, variable valve actuating mechanisms, two-step cam profile switching mechanisms, and deactivation valve lifters to vary the amount by which the valves of an engine are lifted (i.e., opened). Furthermore, engines may utilize devices, such as variable valve actuating mechanisms and cam phasers, to vary the timing of the opening and/or closing of the engine valves relative to the angular position of the engine crankshaft.

Early intake valve closing (EIVC) is one way in which valve lift profiles are varied. As the term itself implies, EIVC involves the early closing of the intake valves, i.e., the intake valves are closed at an advanced angle of the engine crankshaft relative to the crankshaft angle at which the intake valves are closed in a conventional/fixed valve lift profile. For example, in an engine having a fixed valve train the intake valves are closed when the angular position of the crankshaft is approximately 240° (two hundred forty degrees) past top dead center (TDC). Whereas in an engine utilizing a conventional EIVC strategy, the closing of the intake valves typically occurs at approximately 120° (one hundred twenty degrees) past TDC. Thus, a conventional EIVC strategy reduces the duration of time during which the intake valves are open by closing the intake valves early. However, the angular position of the crankshaft at which the intake valves are opened is approximately constant or fixed in a conventional EIVC strategy.

EIVC is typically utilized under light engine operating loads to reduce parasitic pumping losses. Parasitic pumping losses are reduced because the engine is operating in an unthrottled condition and the pressure drop across the intake valves is low as the pistons are moving at a relatively low velocity near TDC. Thus, thermal efficiency of the engine is improved. However, lower effective compression ratios and lower cylinder power and torque result from a conventional EIVC strategy, and inefficiencies in combustion result. Under heavy engine operating loads the losses in power and torque render the strategy undesirable.

Therefore, what is needed in the art is an EIVC apparatus and method that varies the timing of both the opening and closing of the intake valves.

Furthermore, what is needed in the art is an EIVC apparatus and method that varies the amount of lift and the timing of the opening and closing of the intake valves.

Moreover, what is needed in the art is an EIVC apparatus and method that achieves improvements in fuel economy and reduces the level of undesirable emissions.

SUMMARY OF THE INVENTION

The present invention provides an early intake valve closing method and apparatus.

The invention comprises, in one form thereof, a method for early intake valve closing in an internal combustion engine having a crankshaft and at least one exhaust valve, the crankshaft having a top dead center position and a bottom dead center position. The method includes the step of determining engine operating load conditions and parameters. One of a plurality of predetermined valve lift profiles, each of which correspond to a respective range of engine operating load conditions and parameters, is selected dependent at least in part upon the engine operating load conditions and parameters. The engine is commanded to operate the engine intake valves according to the selected one of the plurality of predetermined valve lift profiles to thereby optimize fuel economy and reduce emissions at light to moderate engine loads, to improve torque and power at relatively full engine loads, and improve cold start engine operation under cold start engine conditions.

An advantage of the present invention is that early intake valve closing is achieved with relative mechanical simplicity.

Another advantage of the present invention is EIVC is implemented in such a way as to achieve improved fuel economy and reduced levels of undesirable emissions.

BRIEF DESCRIPTION OF THE DRAWINGS

The above-mentioned and other features and advantages of this invention, and the manner of attaining them, will become apparent and be better understood by reference to the following description of one embodiment of the invention in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DESCRIPTION OF THE PREFERRED EMBODIMENTS

Figure 1:
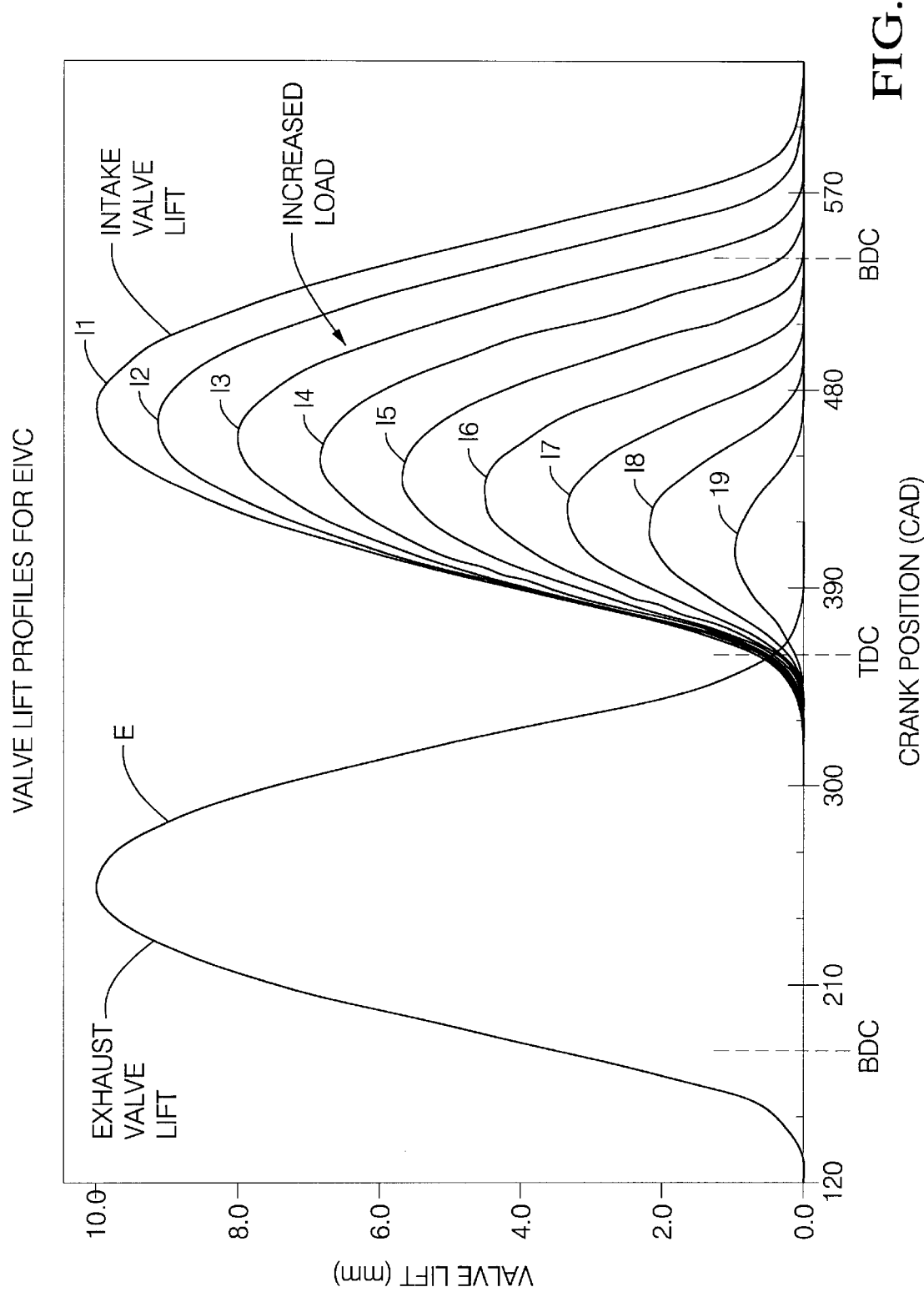
FIG. 1 is a graph of the intake valve lift profiles obtained utilizing a conventional EIVC strategy/system.

Referring now to the drawings, and particularly to FIG. 1, a family of intake valve lift profiles obtained with a conventional EIVC mechanism is shown. Valve lift in millimeters (mm) is plotted on the vertical axis and crankshaft position in degrees is plotted on the horizontal axis. The exhaust valve lift profile is represented by curve E, which shows the exhaust valves beginning to open at a crankshaft angle of approximately 60° (sixty degrees) before bottom dead center (BDC), fully open at approximately 75° (seventy five degrees) after BDC, and closing at approximately 30° (thirty degrees) after top dead center (TDC).

The family of intake valve lift profiles is represented by curves I1–I9. Curve I9 represents the intake valve lift profile at a minimum or low engine load. Curve I9 shows that the intake valves begin to open at a crankshaft angle of approximately 30° (thirty degrees) before TDC, are fully open at approximately 45° (forty five degrees) after TDC with a maximum lift of approximately 1.0 mm, and close at approximately 120° (one hundred twenty degrees) after TDC.

Curve I5 represents the intake valve lift profile at a moderate engine load. Curve I5 shows the intake valves begin to open at a crankshaft angle of approximately 30° (thirty degrees) before TDC, are fully open at approximately 90° (ninety degrees) after TDC with a maximum lift of approximately 5.0 mm, and close at approximately 180° (one hundred eighty degrees) after TDC, or at BDC.

Curve I1 represents the intake valve lift profile at full engine power conditions. Curve I1 shows the intake valves begin to open at a crankshaft angle of approximately 30° (thirty degrees) before TDC, are fully open at approximately 100° (one hundred degrees) after TDC with a maximum lift of approximately 10.0 mm, and close at approximately 60° (sixty degrees) after BDC.

Thus, it is seen that a conventional EIVC strategy opens the intake valves at a substantially constant crankshaft angle regardless of engine load. As engine load increases, a conventional EIVC strategy increases both the amount of valve lift and the crankshaft angle at which the intake valves are closed.

Figure 2:
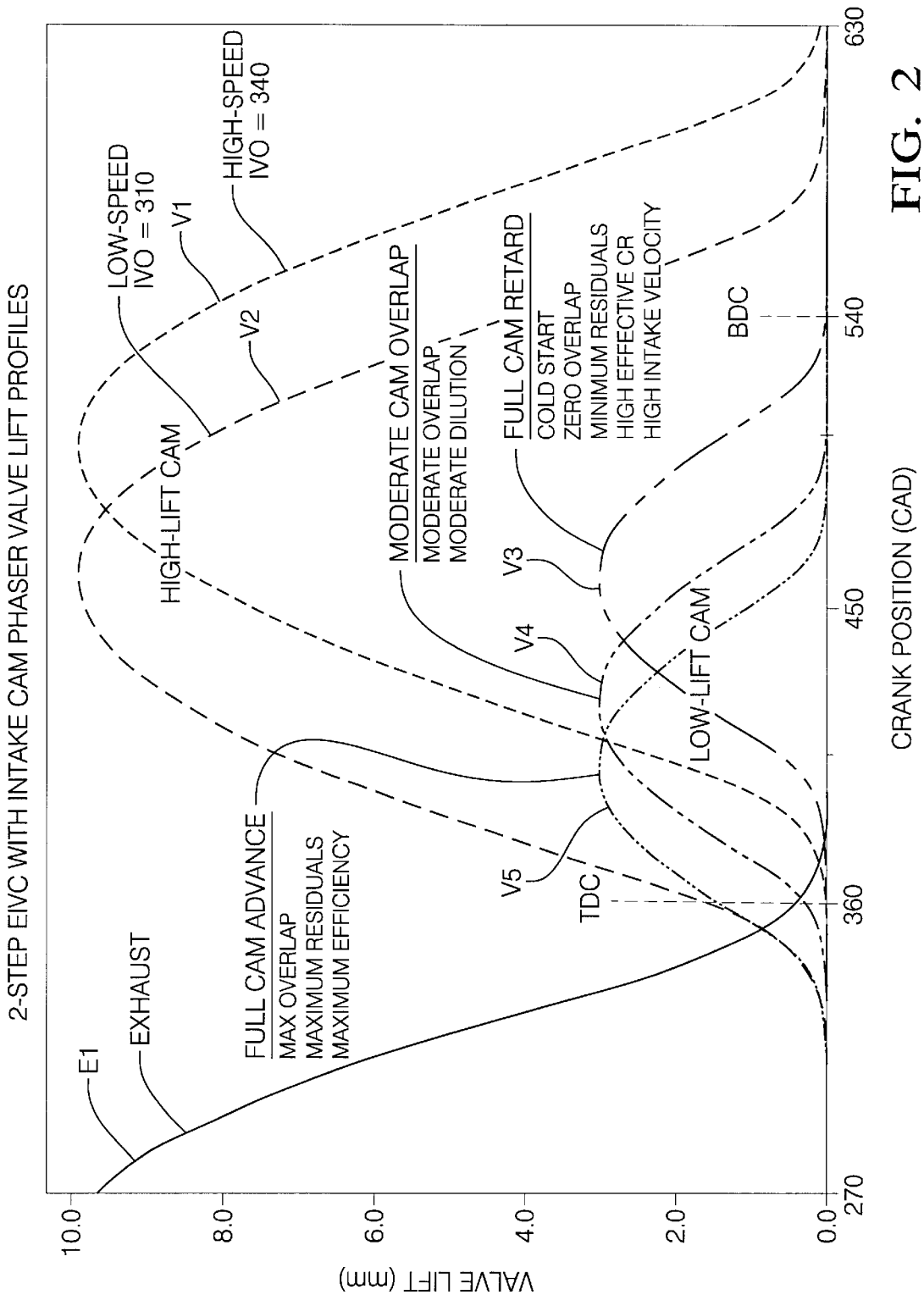
FIG. 2 is a graph of exemplary intake valve lift profiles obtained utilizing the EIVC apparatus and method of the present invention.

Referring now to FIG. 2, an exemplary family of intake valve lift profiles obtained with the EIVC apparatus and method of the present invention is shown. Valve lift in millimeters (mm) is plotted on the vertical axis and crankshaft position in degrees is plotted on the horizontal axis. The exhaust valve lift profile as represented by curve E1 is substantially similar to exhaust curve E of FIG. 1. Exhaust curve E1 shows that the exhaust valves close at approximately 30° (thirty degrees) after TDC.

The family of exemplary intake valve lift profiles obtained with the EIVC apparatus and method of the present invention is represented by curves V1–V5. Curve V5 shows the intake valve lift profile at a light to moderate engine speed and load condition, such as, for example from approximately 1000 to approximately 3000 revolutions per minute (RPMs) engine speed and from approximately 100 to approximately 500 kilo Pascals (kPa) net mean effective pressure (NMEP) engine load. Curve V5 shows that the intake valves begin to open at a crankshaft angle of approximately 50° (fifty degrees) before TDC. The intake valves, as shown by curve V5, are fully open at approximately 20° (twenty degrees) after TDC with a maximum lift of approximately 3.0 mm, and close at approximately 100° (one hundred degrees) after TDC. Thus, in contrast to a conventional EIVC strategy, the EIVC strategy of the present invention increases the overlap of the intake and exhaust valves by, for example, twenty degrees, under light engine operating loads. Further, the EIVC strategy of the present invention has an increased maximum valve lift relative to the maximum valve lift of a conventional EIVC strategy under the same or similar engine operating loads.

The above-described characteristics of curve V5 are obtained by fully advancing the intake camshaft relative to the crankshaft, and operating the intake valves on the low lift profile, with the EIVC apparatus of the present invention, which will be more particularly described hereinafter. Fully advancing the cam relative to the crankshaft provides the increased overlap between the closing of the exhaust valves and the opening of the intake valves, and closes the intake valves early, i.e., approximately 100° after TDC. The increased overlap of the intake and exhaust valves at low engine load conditions results in a substantial amount of residual combustion products remaining in the cylinders and thereby maximizes dilution of the combustion charge. Thus, parasitic pumping losses and the level of undesirable emissions are substantially reduced when the valves are activated by a fully advanced low lift cam.

Curve V3 represents the intake valve lift profile for cold start conditions, such as, for example, an engine temperature of from approximately forty-five degrees Celsius to approximately minus twenty degrees Celsius or lower, an engine speed of less than approximately 1500 RPMs and an engine load of approximately 200 kPa or less. Curve V3 shows that the intake valves begin to open at a crankshaft angle of approximately 30° (thirty degrees) after TDC, are fully open at approximately 100° (one hundred degrees) after TDC with a maximum lift of approximately 3.0 mm, and close at approximately BDC. Thus, in contrast to a conventional EIVC strategy, the intake valves and the exhaust valves have virtually no overlap and the intake valves are open longer than in a conventional EIVC strategy.

The above-described characteristics of curve V3 are obtained by fully retarding the intake camshaft relative to the crankshaft, and operating the intake valves on the low lift profile, with the EIVC apparatus of the present invention. Fully retarding the cam relative to the crankshaft substantially eliminates overlap between the closing of the exhaust valves and the opening of the intake valves, thereby minimizing residual combustion products/dilution of the combustion charge and generating a high intake velocity. Since the intake valves remain open longer, i.e., later in the rotation of the crankshaft, relative to a conventional EIVC strategy, the EIVC strategy of the present invention produces a high effective compression ratio for increased compression temperatures and pressures. Low residuals, high intake velocities and high charge temperatures are especially useful for improving combustion charge mixture preparation during cold start conditions.

Curve V4 represents a mid-point between the intake valve opening and closing crankshaft angles of curve V5 and curve V3 for light/moderate engine speed/load conditions and cold start conditions, respectively. Thus, curve V4 is selected for upper moderate engine operating speed/load conditions, such as, for example, engine operating speed approximately 3000 RPMs or less and an engine load of approximately 400 kPa NMEP or greater. Curve V4 is obtained by moderately advancing the cam relative to the crankshaft, and operating the intake valves on the low lift profile, with the EIVC apparatus of the present invention. Moderately advancing the cam relative to the crankshaft produces moderate overlap between the closing of the exhaust valves and the opening of the intake valves, thereby providing a moderate level of residual combustion products/dilution of the combustion charge. Curve V4, or a intake valve lift profile similar to the one represented by curve V4, is used, such as, for example, to transition from cold start engine operation to normal warm engine operating conditions under idle or light to moderate engine loads.

Curves V1 and V2 represent the intake valve lift profiles for full engine load operating conditions. Curve V2 is selected under low speed, full load conditions, such as, for example, engine speeds of approximately 3000 RPMs or less and engine loads of approximately 700 to approximately 800 kPa NMEP and higher. Curve V2 is obtained by advancing the cam relative to the crankshaft, such that the intake valves close at approximately 20° (twenty degrees)

after BDC, and operating the intake valves on the high lift profile to provide maximum torque at low speeds. Intake valve lift profiles similar to that represented by curve V2 are selected to obtain a relatively advanced closing of the intake valves to thereby optimize engine volumetric efficiency and torque for the particular engine operating speed under full or relatively full loads. Curve V1 is selected under high speed, full engine load conditions, such as, for example, engine speeds greater than approximately 2,500 to approximately 3,000 revolutions per minute, and provides a maximum amount of lift with minimal overlap. Curve V1 is obtained by phasing the camshaft relative to the crankshaft to close the intake valves at a later crankshaft angle relative to curve V2. Thus, the valves are kept open later in the crankshaft rotation such that the valves are closed at approximately 60° (sixty degrees) after BDC and are operated on the high lift profile to maximize torque at high speeds.

Generally, the EIVC apparatus and method of the present invention conjunctively utilizes a two-step cam profile switching device and an intake valve cam phaser to achieve substantial variability in the valve lift profile of the valves of an internal combustion engine in response to engine operating parameters and conditions, as described above and shown in FIG. 2. The EIVC system of the present invention increases thermal efficiency, fuel efficiency and performance while reducing pumping losses and the levels of undesirable emissions over a wide range of engine operating conditions and loads.

Figure 3:
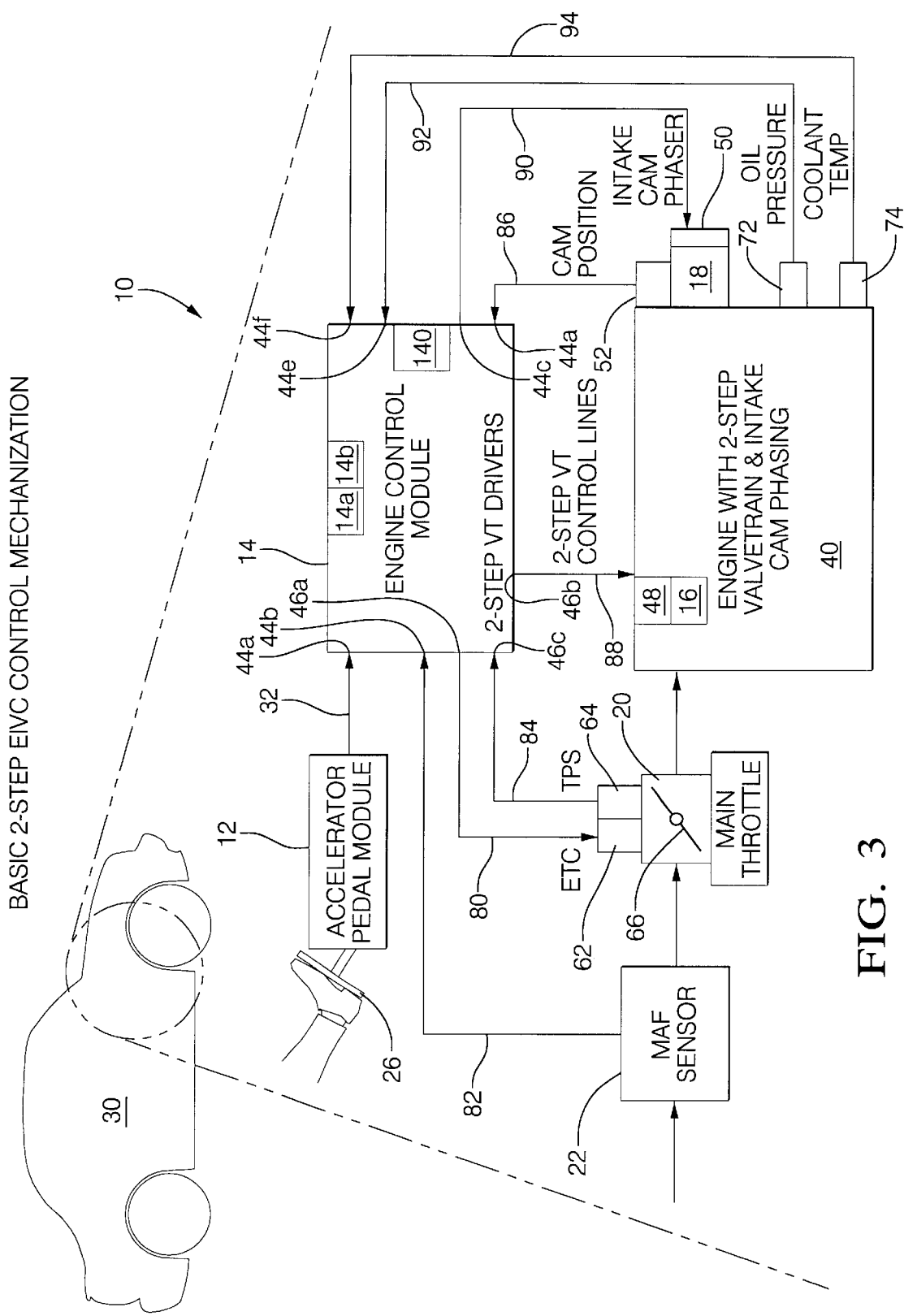
FIG. 3 is schematic diagram of one embodiment of an EIVC apparatus of the present invention.

Referring now to FIG. 3, one embodiment of an EIVC apparatus of the present invention is shown. EIVC apparatus 10 includes pedal module 12, engine control module (ECM) 14, two-step switching device 16, intake cam phaser 18, electronic throttle control module (ETC) 20 and mass air flow (MAF) sensor 22.

Pedal module 12 converts the position of gas pedal 26 of motor vehicle 30 into a desired load command 32, such as, for example, an electrical signal. Desired load command 32 is indicative of the current position, direction of movement, and rate of movement of gas pedal 26, and determines at least in part the load operating conditions of engine 40. Pedal module 12 is electrically connected with ECM 14, as will be described more particularly hereinafter, such that ECM 14 receives desired load command 32.

ECM 14 is a conventional engine control module, including, for example, a microprocessor (not shown) interconnected with various interface circuitry, read only memory 14a and random access memory 14b. Control module 14 further includes a plurality of inputs and outputs through which control module 14 receives and transmits data from and to the devices connected thereto. More particularly, control module 14 includes inputs 44a–44f and outputs 46a–c, the functions and interconnections of which will be described in greater detail hereinafter. Pedal module 12 is electrically connected with pedal input 44a, which receives desired load command 32.

Two-step switching device 16, such as, for example, a two-step roller finger follower as described in commonly-assigned U.S. patent application Ser. No. 09/813,425, attorney docket number 89190.181500 (DP-303029/952), entitled Method and Apparatus for Two-Step Cam Profile Switching, the disclosure of which is incorporated herein by reference, is switchable between a first/high-lift position and a second/low-lift position. With two-step switching device 16 in the first position, an associated engine valve (not shown) is actuated, i.e., lifted, according to a high-lift cam of a camshaft (neither of which is shown) of engine 40. With two-step switching device 16 in the second position, the associated engine valve is actuated/lifted according to a low-lift cam of the camshaft. The high-lift cam and low-lift cam have different lifts, duration and timing configured for improving fuel economy. For sake of clarity, only one two-step switching device 16 is shown. However, it is to be understood that for each valve of engine 40 there is an associated and corresponding two-step switching device 16.

Associated with each two-step switching device 16 is a corresponding two-step actuating device 48, such as, for example, an electronically controlled solenoid, that switches the associated two-step switching device 16 between lift positions. As stated above, only one two-step switching device is shown for the sake of clarity, and therefore only one two-step actuating device 48 is shown. Each two-step actuating device 48 is electrically interconnected with a respective switching output 46b (only one shown) of ECM 14.

Intake cam phaser 18 is a conventional cam phaser as described in commonly-assigned U.S. patent application Ser. No. 09/386,176, entitled Vaned-Type Cam Phaser, attorney docket number 89190.99R375 (DP-300185), the disclosure of which is incorporated herein by reference. Intake cam phaser 18 enables phasing of the intake cam relative to the engine crankshaft, i.e., the angular position of the camshaft relative to the crankshaft (not shown) of engine 40. Intake cam phaser 18 thus enables the opening and/or closing of the intake valves of engine 40 to be phased relative to the rotational or angular position of the crankshaft, thereby phasing the opening and/or closing of the valves relative to piston position. Preferably, intake cam phaser 18 has a wide range of authority, i.e., is capable of phasing the intake cam over a wide range of angles relative to the engine crankshaft, and is capable of substantially continuous phasing of the intake cam relative to the engine crankshaft, rather than discrete phasing. Associated with intake cam phaser 18 is phaser actuating device 50 and cam position sensor 52.

Phaser actuating device 50, such as, for example, a fluid control valve or electric motor, is associated with and actuates cam phaser 18. Phaser actuating device 50 is electrically interconnected with phaser control output 46c of ECM 14. Cam position sensor 52, such as, for example, a conventional electrical, optical or electromechanical cam position sensor, is associated with cam phaser 18. Cam position sensor 52 is electrically connected to cam position input 44d of ECM 14.

Electronic throttle control module (ETC) 20 is a conventional electronic throttle control module, and includes ETC actuating device 62 and throttle position sensor (TPS) 64. ETC 20 further includes a main throttle valve 66 that controls the flow of air into engine 40. ETC actuating device 62, such as, for example, a stepper motor, is electrically connected to throttle control output 46a of ECM 14, and is operable to rotate main throttle valve 66 to a desired position. TPS sensor 64 is a conventional throttle position sensor, which senses the position of throttle valve 66 and is electronically connected throttle position input 44c of ECM 14.

Mass air flow (MAF) sensor 22 is a conventional mass air flow sensor that measures the amount of air flowing through main throttle valve 66. MAF sensor 22 is electrically connected to MAF sensor input 44b of ECM 14.

In use, ECM 14 receives a plurality of electrical signals at the inputs thereof. More particularly, pedal module 12 is electrically interconnected with input 44a of ECM 14, which receives desired load command 32. Desired load command 32 is indicative of the position, rate of change and direction of change in the position of gas pedal 26. MAF sensor input 44b of ECM 14 is electrically connected to MAF sensor 22, which issues MAF sensor signal 82. MAF sensor signal 82, such as, for example, a pulsed or pulse-width modulated electrical signal, is indicative of the amount or mass of air flowing through main throttle valve 66. Throttle position input 44c of ECM 14 is electrically connected to TPS Sensor 64, which issues TPS sensor signal 84. TPS sensor signal 84, such as, for example, an analog voltage dependent at least in part upon the position of main throttle valve 66. Cam position input 44d of ECM 14 is electrically connected to cam position sensor 52, which issues cam position signal 86. Cam position signal 86, such as, for example, a digital electrical signal, is indicative of the position of the camshaft (not shown) of engine 40. Inputs 44e and 44f of ECM 14 are electrically connected to oil pressure sensor 72 and coolant temperature sensor 74, respectively, and receive signals 92 and 94, respectively, therefrom corresponding to oil pressure and coolant temperature, respectively.

Similarly, ECM 14 issues a plurality of outputs. More particularly, throttle control output 46a of ECM 14 is electrically connected to ETC actuating device 62. ECM 14 issues on output 46a ETC control signal 80, such as, for example, a pulsed or a pulse-width modulated signal, to operate ETC actuating device 62 and thereby position main throttle valve 66 to achieve a desired amount or mass of air flow. As ETC control signal 80 is issued, TPS sensor signal 84 is monitored by ECM 14 to ensure throttle valve 66 is moving in the direction and to the position desired. ECM 14 issues on output 46b two-step actuating device control signal 88, such as, for example, a peak and hold analog voltage, to operate two-step actuating device 48 and thereby place two-step switching device 16 into a desired one of the low-lift or high-lift position. Thus, one of the high-lift cam or the low-lift cam is selected, and the desired amount of lift is imparted to the valves of engine 40. ECM 14 issues on output 46c phaser control signal 90, such as, for example, a pulsed or a pulse-width modulated signal, to operate phaser actuating device 50 and thereby position the cam relative to the crankshaft to achieve a desired phasing of the valves of engine 40.

Generally, ECM 14 is programmed to conjunctively control two-step switching device 16, cam phaser 18 and ETC 20 to increase fuel efficiency and decrease undesirable emissions relative to an engine having neither, or only one, of a two-step switching device or a cam phaser. Furthermore, ECM 14 is programmed to conjunctively control those devices to increase fuel efficiency and decrease undesirable emissions relative to an engine incorporating a two-step switching device and a cam phaser that are not conjunctively controlled in accordance with the present invention. Moreover, ECM 14 is programmed to conjunctively control two-step switching device 16 and cam phaser 18 to achieve a degree of fuel economy improvement and emissions reduction that approaches the level of improvement achieved in an engine incorporating a more complex continuously variable valve actuating mechanisms. Further, ECM 14 is programmed to control ETC module 20, and thereby the position of main throttle valve 66, to achieve and ensure smooth switching between the low-lift and high-lift cam profiles.

Figure 4:
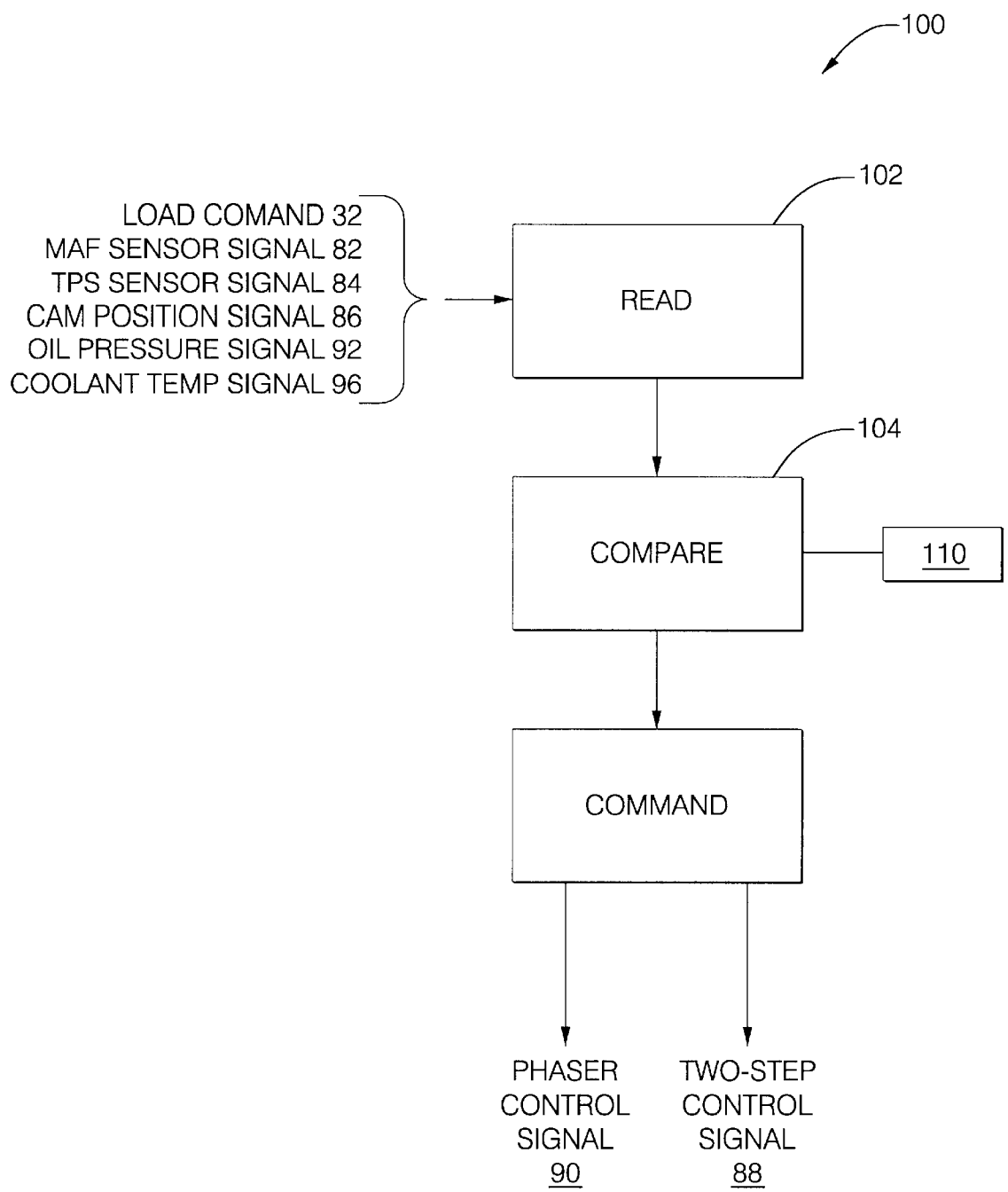
FIG. 4 is a flow chart of one embodiment of an EIVC control method of the present invention.

Referring now to FIG. 4, a flow chart of one embodiment of an EIVC control method of the present invention is shown. EIVC control method 100 is accessible to and executed by ECM 14 in the form of a computer-executable program. EIVC control method 100 is stored as a computer-executable program in, for example, the read-only memory of ECM 14. Generally, the execution of EIVC control method 100 by ECM 14 controls two-step switching device 16, cam phaser 18 and ETC module 20 to increase, dependent at least in part upon engine operating conditions and parameters, both fuel economy and engine power, and to decrease undesirable emissions. EIVC control method 100 includes reading step 102, comparing 104 and command step 106.

Reading step 102 includes the reading of inputs 44a–44f by ECM 14 to thereby determine the current operating conditions and parameters of engine 40. More particularly, ECM 14 reads inputs 44a–44f to thereby determine read load command 32, MAF sensor signal 82, TPS sensor signal 84, cam position signal 86, oil pressure sensor signal 92 and coolant temperature sensor signal 96 (hereinafter collectively referred to as the sensor signals).

Comparing step 104 is then executed by ECM 14, during which the sensor signals are respectively compared with corresponding predetermined values and/or ranges of values that are stored in look up table 110. Based upon comparing step 104, a specific intake valve lift profile is selected that will maximize fuel economy and minimize undesirable emissions for the particular set of engine operating conditions as indicated by the sensor signals.

Look up table 110 contains a range of data points corresponding to the various sensor signals and against which the sensor signals are compared. A predetermined intake valve lift profile corresponds to each of the range of data points contained in look up table 110. Thus, once the range of data points is identified which corresponds to the current state of the sensor signals, the corresponding intake valve lift profile is thereby specified.

When ECM 14 has determined, through the execution of reading step 102 and comparing step 104, that the sensor signals correspond to, for example, a cold start condition, ECM 14 issues at command step 106 appropriate outputs to configure EIVC apparatus 10 to produce intake valve curve V3 (FIG. 2). More particularly, ECM 14 issues on switching output 46b two-step control signal 88 to thereby place two-step switching device 16 into the low-lift position and issues on phaser control output 46c phaser control signal 90 to thereby place cam phaser 18 into the full retard position.

Similarly, when ECM 14 has determined, through the execution of reading step 102 and comparing step 104, that the sensor signals correspond to, for example, a full load, low speed condition, ECM 14 issues at command step 106 appropriate outputs to configure EIVC apparatus 10 to produce intake valve curve V2 (FIG. 2). More particularly, ECM 14 issues on switching output 46b two-step control signal 88 to thereby place two-step switching device 16 into the high-lift position and issues on phaser control output 46c phaser control signal 90 to thereby place cam phaser 18 into an advanced position that yields maximum engine torque for the given engine operating conditions/speeds.

In the embodiment shown, MAF sensor 22 measures the amount of air flowing through main throttle valve 66. However, it is to be understood that the EIVC method and apparatus can be alternately configured, such as, for example, with a (MAP) sensor in place of the MAF sensor.

While this invention has been described as having a preferred design, the present invention can be further modified within the spirit and scope of this disclosure. This application is therefore intended to cover any variations, uses, or adaptations of the present invention using the general principles disclosed herein. Further, this application is intended to cover such departures from the present disclosure as come within the known or customary practice in the art to which this invention pertains and which fall within the limits of the appended claims.

What is claimed:

1. An EIVC apparatus for use with an internal combustion engine, said engine having a crankshaft and at least one intake valve, a cam shaft associated with said at least one intake valve, said EIVC apparatus comprising:

a pedal module issuing a desired load command;

a respective two-step switching device associated with each of said at least one intake valve, each said two-step switching device being switchable between a high-lift position and a low-lift position;

a cam phaser associated with said cam shaft, said cam phaser being operable to change a phase of said cam shaft relative to said crankshaft; and an engine control module electrically interconnected with said pedal module, said two-step switching device and said cam phaser, said engine control module having a memory; and a computer program stored in said memory of said engine control module, said computer program being executable by said engine control module, said engine control module executing said computer program to thereby configure dependent at least in part upon engine operating conditions and parameters said two-step switching device and said cam phaser to produce a selected one of a plurality of predetermined intake valve lift profiles configured for at least one of optimizing fuel economy and emissions under approximately light to approximately moderate engine operating loads, improving torque and power at approximately full engine operating loads, and providing maximum valve overlap and maximum engine efficiency under cold start engine operating conditions.

2. The EIVC apparatus of claim 1, further comprising:

an electronic throttle control having a control input and a throttle position sensor electrically connected to said engine control module; and a mass air flow sensor electrically connected to said ECM.

3. The EIVC apparatus of claim 1, wherein said computer program comprises:

a reading module, said reading module reading at least one of a load command signal, a mass air flow sensor signal, a throttle position sensor signal, a cam position sensor signal, an oil pressure sensor signal and a coolant temperature sensor signal to thereby determine an engine operating load;

a look-up module wherein one of said plurality of predetermined valve lift profiles is selected dependent at least in part upon said engine operating load; and a command module commanding the engine to operate the engine intake valves according to said one of said plurality of predetermined valve lift profiles.

4. A method of early intake valve closing for an internal combustion engine, said engine including a crankshaft and at least one exhaust valve, said crankshaft having a top dead center position and a bottom dead center position, said method comprising the steps of:

determining engine operating load conditions and parameters;

selecting one of a plurality of predetermined valve lift profiles, each of said plurality of predetermined valve lift profiles corresponding to a respective range of engine operating load conditions and parameters, said selected one of said plurality of predetermined valve lift profiles being selected dependent at least in part upon said engine operating load conditions and parameters; and commanding the engine to operate the engine intake valves according to said selected one of said plurality of predetermined valve lift profiles.

5. The method of claim 4, wherein said determining step comprises an engine control module electrically connected to and reading at least one of a load command signal, a mass air flow sensor signal, a throttle position sensor signal, a cam position sensor signal, an oil pressure sensor signal and a coolant temperature sensor signal.

6. The method of claim 5, further comprising the step of comparing at least one of said load command signal, said mass air flow sensor signal, a throttle position sensor signal, a cam position sensor signal, an oil pressure sensor signal and a coolant temperature sensor signal with predetermined ranges of values therefor to thereby determine said range of engine operating load conditions and parameters, said selected one of a plurality of predetermined valve lift profiles corresponding to said range of engine operating load conditions and parameters.

7. The method of claim 4, wherein said plurality of predetermined valve lift profiles are configured for at least one of optimizing fuel economy and emissions under approximately light to approximately moderate engine operating loads, improving torque and power at approximately full engine operating loads, and providing minimum valve overlap and maximum engine combustion efficiency under cold start engine operating conditions.

8. The method of claim 4, wherein said commanding step comprises:

issuing a two-step control signal to thereby place a two-step switching device into one of a high lift long duration and a low lift short duration position; and issuing a phaser control signal to position a cam phaser.

9. The method of claim 8, wherein said low-lift position provides from approximately thirty percent to approximately fifty percent of the lift of said high-lift position, and from approximately forty percent to approximately sixty percent of the duration of the high-lift position.

10. The method of claim 8, wherein said commanding step further comprises issuing an electronic throttle control signal to an electronic throttle control module to position a main throttle valve.

11. The method of claim 8, wherein said determining step indicates a cold start engine operating condition, said commanding step comprising:

issuing said two-step control signal to thereby place said two-step switching device into said low lift position; and issuing said phaser control signal to thereby position said cam phaser in a full retard position.

12. The method of claim 11, wherein said full retard position opens the engine intake valves at from approximately fifteen degrees after top dead center to approximately forty five degrees after top dead center and closing at approximately fifteen degrees prior to approximately fifteen degrees subsequent to bottom dead center.

13. The method of claim 8, wherein said determining step indicates a light to moderate engine load operating condition, said commanding step comprising:

issuing said two-step control signal to thereby place said two-step switching device into said low lift position; and issuing said phaser control signal to thereby position said cam phaser in a predetermined advanced position, said predetermined advanced position selected to optimize fuel economy and reduce emissions.

14. The method of claim 13, wherein said predetermined advanced position opens the engine intake valves at from approximately sixty degrees before top dead center to approximately thirty degrees before top dead center and closing at from approximately ninety degrees after to approximately one hundred twenty degrees after bottom dead center.

15. The method of claim 8, wherein said determining step indicates a full engine load and low-speed operating condition, said commanding step comprising:

issuing said two-step control signal to thereby place said two-step switching device into said high lift position; and issuing said phaser control signal to thereby position said cam phaser in a predetermined advanced position, said predetermined advanced position selected to optimize engine torque.

16. The method of claim 15, wherein said predetermined advanced position opens the engine intake valves at from approximately seventy degrees before top dead center to approximately fifty degrees before top dead center and closing at from approximately twenty degrees after to approximately fifty degrees after bottom dead center.

17. The method of claim 8, wherein said determining step indicates a full engine load and high-speed operating condition, said commanding step comprising:

issuing said two-step control signal to thereby place said two-step switching device into said high lift position; and issuing said phaser control signal to thereby position said cam phaser in a predetermined moderately retarded position, said predetermined moderately retarded position selected to optimize engine power output.

18. The method of claim 17, wherein said predetermined moderately advanced position opens the engine intake valves at from approximately thirty degrees before top dead center to approximately top dead center and closing at approximately sixty degrees to approximately ninety after bottom dead center.

* * * * *